(12) United States Patent
Compton et al.

(10) Patent No.: US 8,121,033 B2
(45) Date of Patent: *Feb. 21, 2012

(54) METHODS FOR PACKET NETWORK TRAFFIC REGULATION

(75) Inventors: Charles L. Compton, Philadelphia, PA (US); Richard M. Woundy, North Reading, MA (US); John G. Leddy, Philadelphia, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 1179 days.

This patent is subject to a terminal disclaimer.

(21) Appl. No.: 11/857,744

(22) Filed: Sep. 19, 2007

(65) Prior Publication Data

US 2008/0031132 A1    Feb. 7, 2008

Related U.S. Application Data

(63) Continuation of application No. 10/690,259, filed on Oct. 21, 2003, now Pat. No. 7,289,447.

(51) Int. Cl.
 *H04L 12/28*    (2006.01)
(52) U.S. Cl. ........................................ 370/235; 370/412
(58) Field of Classification Search .................. None
See application file for complete search history.

(56) References Cited

U.S. PATENT DOCUMENTS

| | | | |
|---|---|---|---|
| 5,274,644 A | 12/1993 | Berger et al. | |
| 5,289,462 A | 2/1994 | Ahmadi et al. | |
| 6,118,791 A | 9/2000 | Fichou et al. | |
| 6,147,970 A | 11/2000 | Troxel | |
| 6,373,824 B1 * | 4/2002 | Tang et al. | 370/252 |
| 6,748,435 B1 | 6/2004 | Wang et al. | |
| 6,810,422 B1 * | 10/2004 | Cross | 709/227 |
| 6,829,649 B1 | 12/2004 | Shorey et al. | |
| 6,950,395 B1 | 9/2005 | Bashandy et al. | |
| 2003/0086140 A1 | 5/2003 | Thomas et al. | |
| 2003/0093526 A1 * | 5/2003 | Nandagopalan et al. | 709/225 |
| 2003/0152084 A1 | 8/2003 | Lee et al. | |
| 2003/0231648 A1 * | 12/2003 | Tang | 370/450 |
| 2004/0062259 A1 * | 4/2004 | Jeffries et al. | 370/412 |
| 2004/0081095 A1 | 4/2004 | Liu et al. | |
| 2005/0120102 A1 | 6/2005 | Gandhi et al. | |

OTHER PUBLICATIONS

Cisco IOS Quality of Service Solutions Configuration Guide, Policing and Shaping Overview, (Cisco Systems, Inc., May 2003), pp. QC-203-QC-218.
Canadian Application No. 2,691,641; Office Action dated Jul. 28, 2010.

* cited by examiner

*Primary Examiner* — Steven H Nguyen
(74) *Attorney, Agent, or Firm* — Banner & Witcoff, Ltd.

(57) ABSTRACT

A method of traffic regulation in a packet communication network involves a token bucket associated with a subscriber. Packets arriving at the regulator are handled in accordance with the token bucket configuration. The method involves measuring a demand placed on the network by the subscriber. The token bucket configuration is dynamically adjusted based on the demand. Another method of traffic regulation handles packets arriving at the regulator in accordance with first and second token bucket configurations. The first token bucket regulates packet rate while the second token bucket regulates data rate. Another method of traffic regulation involves handling packets in accordance with a token bucket configuration, where the amount of tokens to be removed is based on the amount of the flow and is further based on a classification of the flow. Packet-level devices for traffic regulation are also contemplated.

17 Claims, 4 Drawing Sheets

Dynamically Adjust Token Bucket Configuration Based on Network Demand

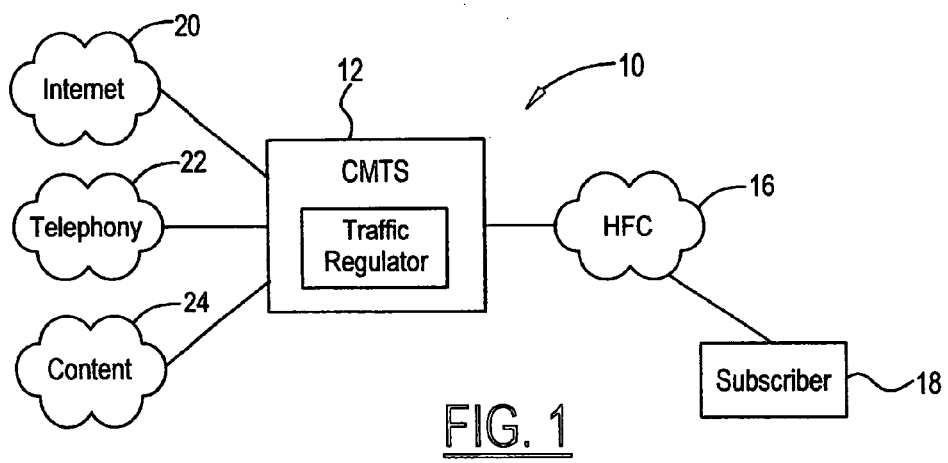
FIG. 1
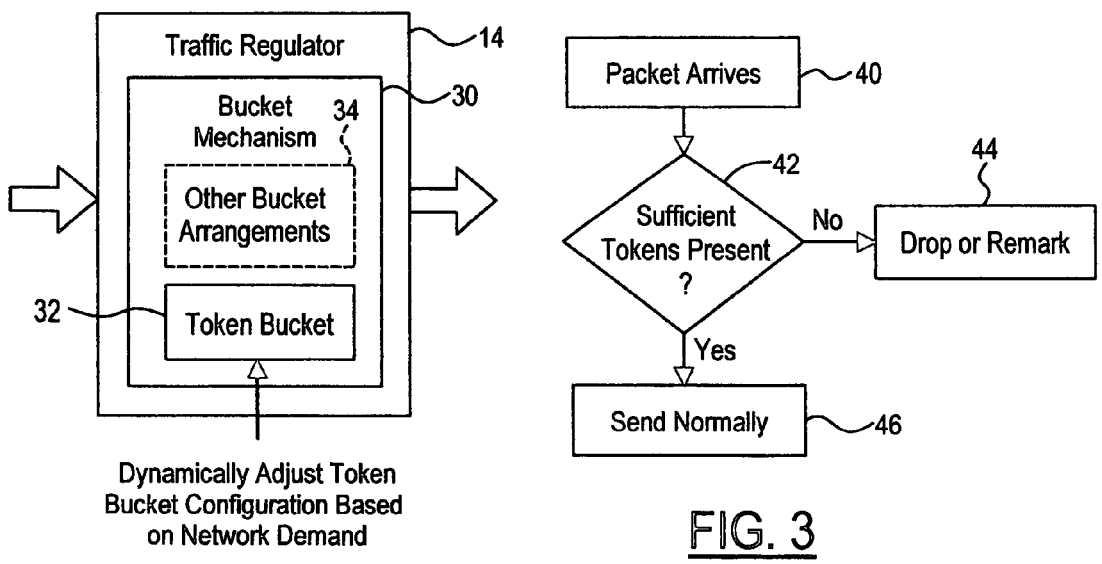
FIG. 2
FIG. 3
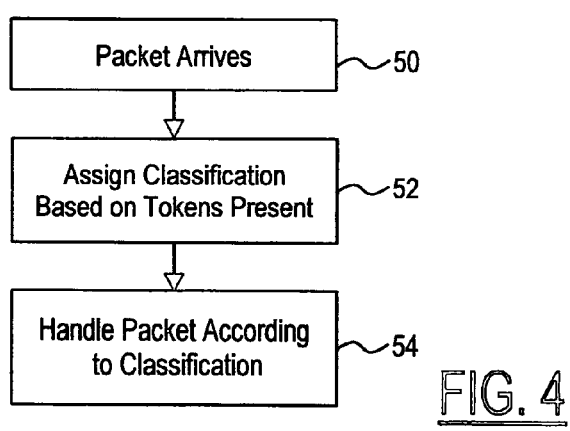
FIG. 4

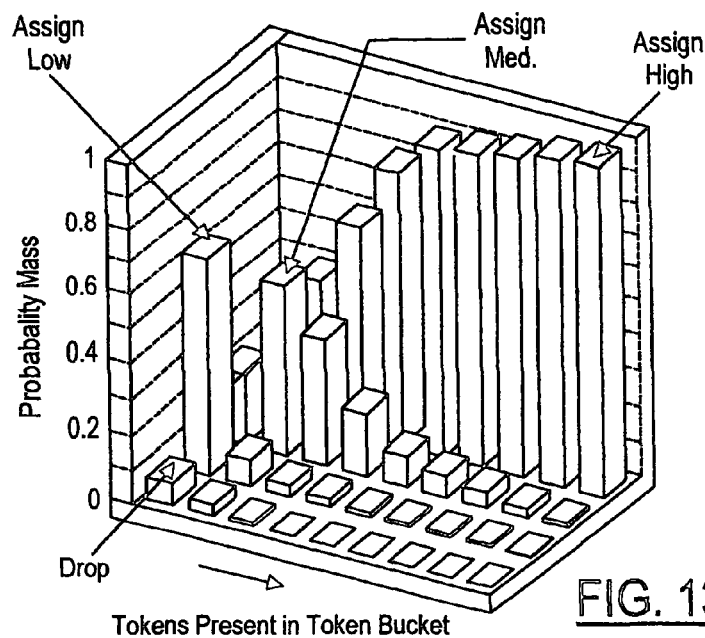
FIG. 13
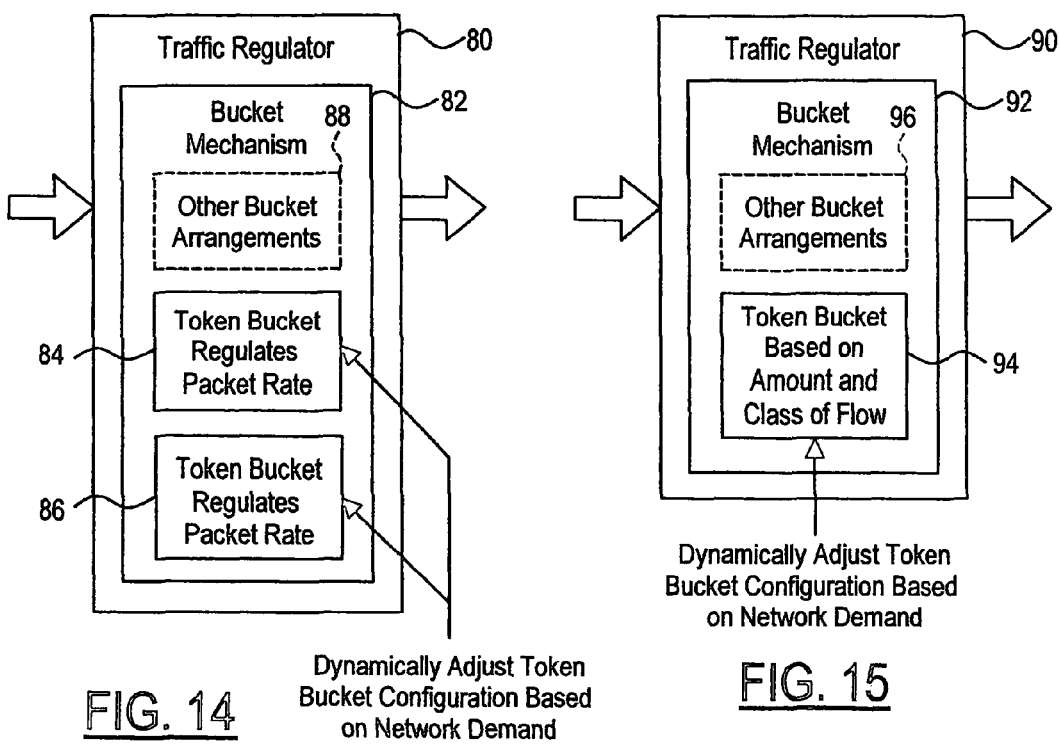
FIG. 14
FIG. 15
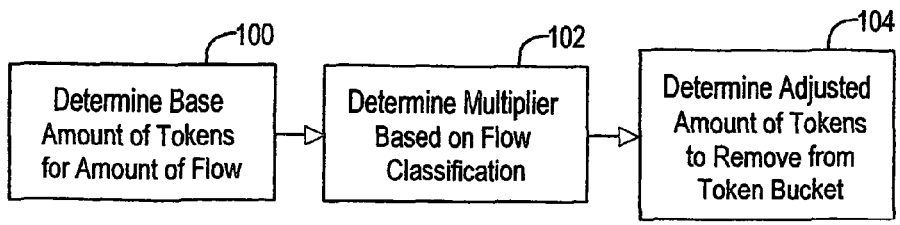
FIG. 16

METHODS FOR PACKET NETWORK TRAFFIC REGULATION

CROSS-REFERENCE TO RELATED APPLICATIONS

This application is a continuation of U.S. application Ser. No. 10/690,259, filed Oct. 21, 2003, now U.S. Pat. No. 7,289,447, which is hereby incorporated by reference in its entirety.

BACKGROUND OF THE INVENTION

1. Field of the Invention

The present invention relates to bucket mechanisms for traffic regulation in a data network.

2. Background Art

A packet communication network accommodates data contained inside packets. Packet traffic, if not regulated, may cause network congestion. During network congestion, packets may be dropped or lost. Traffic regulation techniques attempt to manage network traffic to avoid congestion. Bucket mechanisms are one technique used to regulate traffic at the packet level. Bucket mechanisms include one or more token buckets, leaky buckets, and any other bucket arrangement used for policing and/or shaping data by using tokens or the equivalent thereof.

An existing traffic regulator using a bucket mechanism includes a token bucket. The token bucket receives new tokens at a fixed rate. The maximum number of tokens that the bucket can hold is the bucket depth. If the bucket is already full when a new token is received, the new token is ignored. When a packet arrives at the regulator, a number of tokens equal to the bit size (or byte size in some applications) of the packet must be removed from the bucket for the packet to be sent normally. In the event that there are not enough tokens present in the bucket, the packet is either dropped or remarked with a lower priority and then sent. The rate that new tokens are received at the token bucket defines the maximum sustained normal data rate, while the bucket depth defines the maximum data burst size. The bucket mechanism may optionally include multiple policy support. That is, different classifications of traffic may be regulated by different token buckets such that the token bucket for one class of traffic may be defined differently than the token bucket for another class of traffic.

An existing packet communication network that is used extensively is the Internet. The Internet is a collection of interconnected networks. An Internet service provider (ISP) provides its subscribers access to the Internet. The transmission control protocol/Internet protocol (TCP/IP) family of protocols is used for communication over the Internet. A typical application for a traffic regulator using a bucket mechanism is to locate the traffic regulator at the subscriber's connection to the ISP to regulate downstream data flow (from the ISP to the subscriber). The ISP configures the traffic regulator by defining the bucket mechanism parameters. The parameters remain fixed and are configured according to the subscriber agreement to provide the agreed upon maximum sustained normal data rate in the downstream direction. A suitable technique is used to regulate upstream data transfer.

The ISP typically bills the subscriber for Internet access in a flat rate arrangement that allows unlimited access for a fixed monthly or yearly fee. This arrangement simplifies billing but results in a situation where a small portion of the subscriber base is responsible for a majority of the ISP network costs. That is, a small portion of the subscriber base demands a majority of the network resources.

Accordingly, this flat rate billing arrangement for Internet access typically used by ISP's results in a somewhat inequitable distribution of service costs to the subscribers. These inequities could be addressed by modifying the billing approach. For example, a tiered billing structure or strict usage-based billing could be used to better match the amount billed to a subscriber to the actual subscriber usage. However, in certain situations it may be desirable to stay with flat rate billing. Further, there may be certain situations where modifying the billing approach does not fully address the problem of inequitable service cost distribution.

Background information may be found in U.S. Pat. Nos. 5,289,462 and 6,147,970, and in *Cisco IOS Quality of Service Solutions Configuration Guide, Policing and Shaping Overview* (Cisco Systems, Inc., May 2003), pages QC-203-QC-218.

For the foregoing reasons, there is a need for an improved traffic regulation method that provides a more equitable distribution of network resources to subscribers.

SUMMARY OF THE INVENTION

It is an object of the present invention to regulate traffic in a packet communication network in a way that dynamically adjusts a subscriber associated token bucket based on the resource demand placed on the network by the subscriber.

In carrying out the present invention, a method of traffic regulation in a packet communication network is provided. The method includes receiving packets destined for a subscriber at a regulator in a network. The regulator includes a token bucket having a given configuration such that the token bucket receives new tokens at a fill rate and has a depth for holding the tokens. The token bucket fill rate defines a sustain rate indicative of the rate at which the subscriber is permitted to receive packets over a given period of time. The token bucket depth defines a burst capability indicative of the maximum number of packets the subscriber is permitted to receive together at a given time. The method further includes measuring a demand placed on the network by the subscriber over a period of time prior to the packets being received at the regulator to determine whether the demand meets the sustain rate. The method includes dynamically adjusting the configuration of the token bucket to increase the token bucket depth only if the demand is less than the sustain rate upon the number of packets received at the regulator exceeding the burst capability in order to permit the subscriber to receive the packets together at a given time. The method further includes handling the packets at the regulator in accordance with the configuration of the token bucket.

It is appreciated that the traffic regulator may take a variety of forms and includes a bucket mechanism. The bucket mechanism may also take a variety of forms and may include one or more token buckets, leaky buckets, or other bucket arrangements to provide more complex packet handling when required for a particular application. It is appreciated that the token bucket is an aspect of the bucket mechanism behavior and may be achieved in any suitable way. That is, the bucket mechanism may have a number of aspects including a token bucket aspect to determine the conformance of incoming data. The bucket mechanism may also have additional aspects including, for example, a leaky bucket aspect to shape outgoing data. It is appreciated that the various aspects of the bucket mechanism may be achieved through any suitable arrangements for processing data.

Handling packets in accordance with the token bucket configuration may occur in a variety of ways. In one aspect, the present invention comprehends handling a packet in a normal fashion when sufficient tokens are present in the token bucket, and otherwise handling a packet in a special fashion. The special fashion used when sufficient tokens are not present in the bucket may involve dropping the packet or assigning a classification to the packet. In another aspect, the present invention comprehends handling a packet that arrives at the regulator by assigning a classification to the packet that is based on the number of tokens present in the bucket when the packet arrives.

Implementations of the present invention that assign classifications to packets during packet handling (also sometimes called remarking) may treat the remarked packets in a number of different ways. The remarked packets may simply be further processed by the bucket mechanism or sent after remarking with the remarking affecting downstream processing. Alternatively, in an implementation where the bucket mechanism includes multiple policy support, the remarked packets may be reprocessed by the bucket mechanism (because they are now part of a different class) so that the packets are handled according to the appropriate policy.

Further, in implementations of the present invention that assign classifications to packets during packet handling, the assigning of the classification may take place in accordance with any suitable classification assignment policy. For example, the assigning of the classification may take place in accordance with a predetermined relationship between the number of tokens present in the token bucket and the appropriate classification. For example, the assigning of the classification may take place in accordance with a probability mass function that determines the probability mass for each classification based on a number of tokens present in the token bucket. When a probability mass function is used, a "drop" classification may be defined to designate packets that are to be dropped. In this way, the probability mass function may provide random early (before the token bucket empties) packet dropping.

It is appreciated that measuring the demand placed on the packet communication network by the subscriber may occur in a variety of ways. In one aspect, the present invention comprehends measuring the demand by monitoring the number of tokens present in the token bucket. Preferably, measuring the demand further comprises determining a burst demand based on observations made while monitoring the number of tokens present in the token bucket over a period of time. Alternatively, the bucket mechanism may include a second bucket arrangement associated with the subscriber, and measuring the demand includes monitoring the second bucket arrangement. Further in the alternative, the demand may be measured by measuring the demand placed on the packet communication network by the subscriber for traffic in a different direction than the direction traffic that is regulated by the subscriber's token bucket.

It is appreciated that dynamically adjusting the token bucket configuration for the subscriber may occur in a variety of ways. In one aspect, the present invention comprehends dynamically adjusting the token bucket configuration by modifying the bucket depth. In an implementation that assigns classifications to packets during packet handling, dynamically adjusting may include modifying the policy to which the assigning of the classification conforms. The policy to which the assigning of the classification conforms may be, for example, based on a pre-determined relationship between number of tokens present in the token bucket and appropriate classification, or based on a probability mass function that determines the probability mass for each classification (optionally including a "drop" classification) based on the number of tokens present in the token bucket.

The advantages associated with embodiments of the present invention are numerous. For example, the subscriber's token bucket configuration is dynamically adjusted based on demand to deliver higher performance for certain types of subscriber demand behavior. Adjustment may, for example, increase or decrease the effective burst ability (via, for example, changes to bucket depth and/or classification assignment policy) to temporarily receive data at a rate exceeding the token bucket fill rate. Adjustment may, for example, ensure that bandwidth is equitably distributed among the subscribers in the face of network over-subscription, and in the face of vastly different network usage characteristics of average and heavy-usage subscribers.

Further, in carrying out the present invention, a method of traffic regulation in a packet communication network is provided. The network includes a traffic regulator for regulating traffic at the packet level. The traffic regulator includes first and second token buckets associated with a subscriber. The first token bucket is configured to receive new tokens at a first fill rate and has a first bucket depth. The second token bucket is configured to receive new tokens at a second fill rate and has a second bucket depth. The method includes handling packets arriving at the regulator in accordance with the first and second token bucket configurations. The first token bucket uses tokens to regulate the packet flow in terms of packet rate and the second token bucket uses tokens to regulate the packet flow in terms of data rate such that a particular packet is subjected to handling in accordance with both the token bucket configurations. The method further includes measuring a demand placed on the network by the subscriber. The method further includes dynamically adjusting the configuration of the token bucket based on the demand.

Further, in carrying out the present invention, a method of traffic regulation in a packet communication network is provided. The method includes receiving packets destined for a subscriber at a regulator in a network. The regulator includes a token bucket having a given configuration such that the token bucket receives new tokens at a fill rate and has a depth for holding the tokens. The token bucket fill rate defines a sustain rate indicative of the rate at which the subscriber is permitted to receive packets over a given period of time. The token bucket depth defines a burst capability indicative of the maximum number of packets the subscriber is permitted to receive together at a given time. The method further includes measuring a demand placed on the network by the subscriber over a period of time prior to the packets being received at the regulator to determine whether the demand meets the sustain rate. The method further includes dynamically adjusting the configuration of the token bucket to increase the token bucket fill rate and the token bucket depth only if the demand is less than the sustain rate upon the number of packets received at the regulator exceeding the burst capability. The method includes handling the packets at the regulator in accordance with the configuration of the token bucket. The token bucket uses tokens to regulate the packet flow by removing tokens from the token bucket when handling packets. The amount of tokens to be removed being based on the amount of the flow and being further based on a classification of the flow. That is, the identical amount of flow may result in different amounts of tokens being removed for different classifications of traffic.

The amount of flow serving as the partial basis for the amount of tokens to be removed may be flow in terms of data or flow in terms of packets. The classification of the flow preferably dictates a token multiplier. That is, the amount of the flow (in terms of data or in terms of packets depending on the implementation) determines a base number of tokens that is multiplied by the multiplier determined from the flow classification to determine the total number of tokens to be removed.

The present invention also comprehends packet-level devices programmed to carry out methods and techniques of the present invention. The present invention is particularly useful in a TCP/IP network or any other network with a connection-based protocol running over the packet-level traffic. In this way, dropped packets result in the connection-based protocol reducing the effective data rate. In this way, the token bucket aspect of the bucket mechanism determines conformance of the incoming data and takes appropriate actions in the presence of non-conforming data.

The above objects and other objects, features, and advantages of the present invention are readily apparent from the following detailed description of the preferred embodiment when taken in connection with the accompanying drawings.

BRIEF DESCRIPTION OF THE DRAWINGS

FIG. 1 illustrates a cable network including a traffic regulator programmed to dynamically adjust the token bucket configuration for a subscriber based on demand in accordance with the present invention;

FIG. 2 illustrates the traffic regulator in more detail;

FIG. 3 illustrates a first technique for packet handling;

FIG. 4 illustrates a second technique for packet handling;

FIG. 13 illustrates a dynamic adjustment of the token bucket configuration and is best understood with a comparison to FIG. 7;

FIG. 14 illustrates a traffic regulator in an alternative embodiment of the present invention that subjects packet flow to packet rate regulation and data rate regulation;

FIG. 15 illustrates a traffic regulator in an alternative embodiment of the present invention that uses a token bucket based on amount and class of flow; and FIG. 16 illustrates using a class based multiplier to determine the amount of tokens to be removed from the token bucket during packet handling with the traffic regulator of FIG. 15.

DETAILED DESCRIPTION OF THE PREFERRED EMBODIMENT

Figure 5:
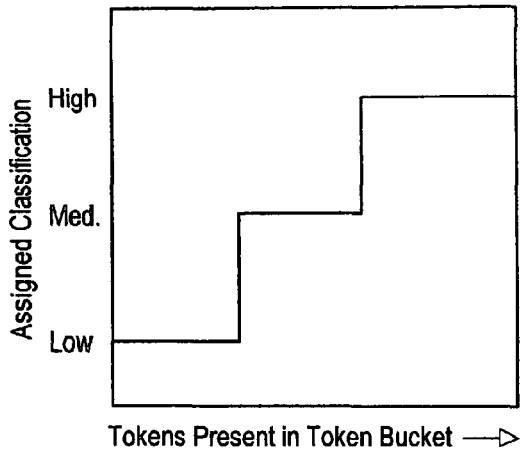
FIG. 5 illustrates a graph depicting classification assignment based on tokens present.

With reference to FIG. 1, a cable network is generally indicated at 10. Cable network 10 includes regional cable modem termination system (CMTS) 12. CMTS 12 includes a traffic regulator 14. CMTS 12 connects through hybrid fiber coax (HFC) network 16 to provide services to subscribers. The services available from CMTS 12 for subscriber 18 include Internet service as indicated at 20, telephony service as indicated at 22 and other content service as indicated at 24. Traffic regulator 14 attempts to manage network traffic at the packet level to avoid congestion and is illustrated in more detail in FIG. 2.

With reference to FIG. 2, traffic regulator 14 regulates traffic at the packet level and includes bucket mechanism 30. Bucket mechanism 30 includes a token bucket 32 associated with subscriber 18. Token bucket 32 is configured to receive new tokens at a fill rate and is configured with a bucket depth. It is appreciated that traffic regulator 14 may take a variety of forms and that bucket mechanism 30 may also take a variety of forms. Bucket mechanism 30 may include one or more token buckets, leaky buckets, or other bucket arrangements 34 to provide more complex packet handling when required for a particular application. The configuration of token bucket 32 is dynamically adjusted based on network demand from the subscriber.

Handling packets in accordance with the token bucket configuration of token bucket 32 may occur in a variety of ways. FIG. 3 illustrates a first technique for packet handling. Block 40 indicates packet arrival at token bucket 32. Decision block 42 checks to see if there are enough tokens present in token bucket 32 to send the packet normally. If sufficient tokens are present, the packet is sent normally at block 46. In the event that there are not enough tokens present in the bucket 32, the packet is either dropped or remarked as indicated at block 44.

FIG. 4 illustrates a second technique for packet handling. Block 50 illustrates the arrival of the packet. Block 52 assigns a classification to the packet that is based on the number of tokens present in token bucket 32. At block 54, the packet is handled in accordance with the assigned classification.

FIG. 5 illustrates a graph depicting class assignment based on tokens present. In FIG. 5, the x-axis represents the amount of tokens present in token bucket 32. The y-axis represents the assigned classification. As shown, the assigned classification is a higher class when more tokens are present in token bucket 32 and a lower class when less tokens are present in token bucket 32.

Figure 6:
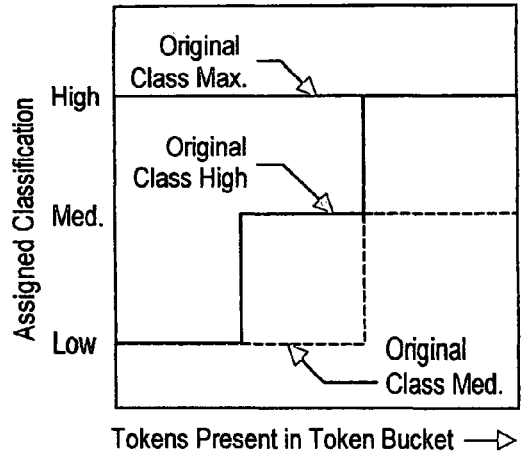
FIG. 6 illustrates a graph depicting classification assignment based on tokens present where the packets had an original class and are being remarked.

FIG. 6 illustrates a graph depicting class assignment based on tokens present where the packets arrived with an original class and are being remarked. The x-axis represents the amount of tokens present in token bucket 32. The y-axis represents the assigned classification. As shown, generally, the assigned classification is a higher class when more tokens are present in token bucket 32 and a lower class when less tokens are present in token bucket 32. The relationship between number of tokens present in token bucket 32 and the assigned classification is different for each original class. As shown, packets originally marked as maximum class are always remarked at the highest assignable class. Packets originally marked as high class are remarked as high, medium, or low class depending on the amount of tokens present in token bucket 32. Packets originally marked as medium class are remarked as medium or low class depending on the amount of tokens present in token bucket 32.

When classifications are assigned to packets during packet handling, bucket mechanism 30 may treat the remarked packets in a number of different ways. The remarked packets may simply be sent after remarking. Alternatively, in an implementation where bucket mechanism 30 includes multiple policy support, the remarked packets may be reprocessed by bucket mechanism 30 so that the packets are handled according to the appropriate policy.

Figure 7:
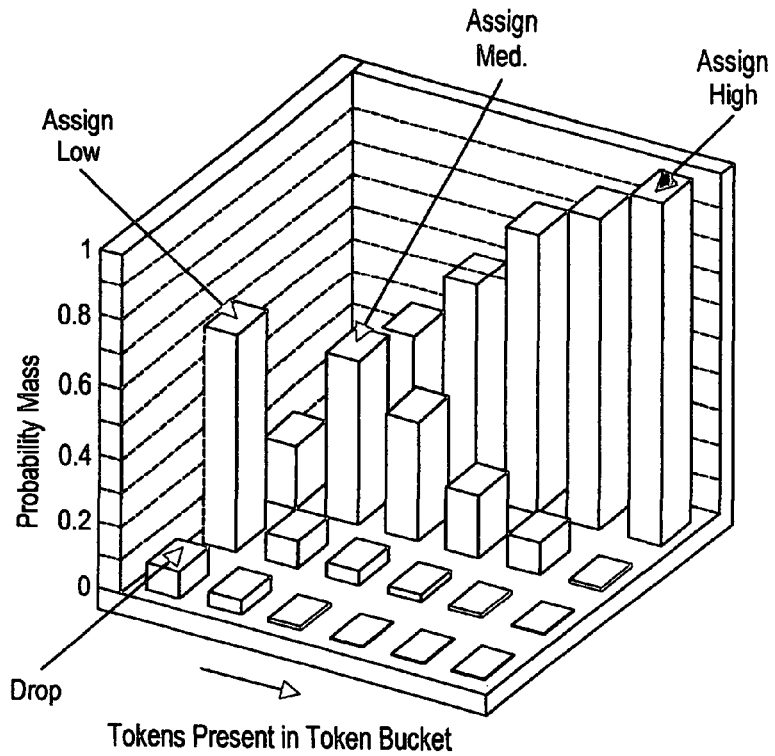
FIG. 7 illustrates a chart depicting classification assignment based on tokens present using a probability mass function.

Further, when classifications are assigned to packets during packet handling, the assigning of the classification may take place in accordance with any suitable classification assignment policy. FIGS. 5 and 6 illustrate the assigning of the classification in accordance with a predetermined relationship between the number of tokens present in the token bucket and appropriate classification. FIG. 7 illustrates the assigning of the classification in accordance with a probability mass function that determines the probability mass for each classification based on a number of tokens present in the token bucket.

FIG. 7 illustrates a chart depicting classification assignment based on tokens present using a probability mass function. In FIG. 7, which uses a left-handed coordinate system, the x-axis represents the amount of tokens present in token bucket 32. The y-axis represents the assigned classification. The z-axis represents probability mass. As shown, when many tokens are present, the high class has by far the greatest probability mass. As the number of tokens present decreases, the high class probability mass decreases, and the medium class probability mass increases. As the number of tokens present decreases even more, the high class probability mass continues to decrease, the medium class probability mass peaks and then decreases, and the low class probability mass increases rapidly.

A probability mass for a "drop" classification is also depicted on the chart in FIG. 7. The "drop" classification designates packets that are to be dropped. The probability mass function provides random early (before the token bucket empties) packet dropping due to the "drop" class probability mass.

It is appreciated that the classification assignment using a probability mass function may also be used in applications where packets arrive with an original class and are remarked. In such a situation, each original class should have a corresponding probability mass function for assigning a class for remarking.

It is also appreciated that the traffic class for a particular packet may be indicated using any known technique for traffic classification. For example, known techniques involving DiffServe CodePoint (DSCP), Class of Service (CoS), Quality of Service (QoS), and Type of Service (ToS) may be appropriate depending on the situation.

Figure 8:
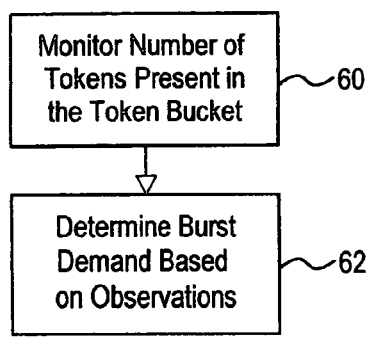
FIG. 8 illustrates a first technique for measuring the subscriber's network demand.
Figure 9:
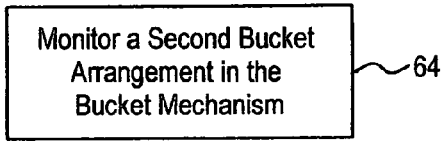
FIG. 9 illustrates a second technique for measuring the subscriber's network demand.
Figure 10:
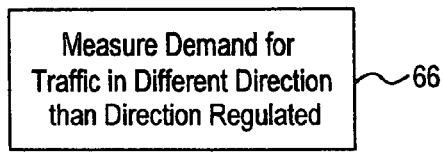
FIG. 10 illustrates a third technique for measuring the subscriber's network demand.

It is appreciated that measuring the demand placed on the network by the subscriber may occur in a variety of ways. FIG. 8 illustrates a first technique for measuring the subscriber's demand. At block 60, the number of tokens present in token bucket 32 is monitored. At block 62, a burst demand is determined based on observations made while monitoring at block 60. FIG. 9 illustrates a second technique for measuring the subscriber's demand. In this second technique, bucket mechanism 30 includes a second bucket arrangement associated with the subscriber (indicated by optional other bucket arrangements 34). At block 64, measuring the demand includes monitoring the second bucket arrangement. FIG. 10 illustrates a third technique for measuring the subscriber's demand. In this third technique, demand is measured by measuring the demand placed on the network by the subscriber 18 for traffic in a different direction than the direction of traffic that is regulated by the subscriber's token bucket 32. The demand measurements may also be affected by time of day, overall network load, or other factors in addition to being affected by the activities of the subscriber.

It is appreciated that dynamically adjusting the token bucket configuration for the subscriber's token bucket 32 may occur in a variety of ways. The depth of token bucket 32 may be modified. In an implementation that assigns classifications to packets during packet handling, the policy to which the assigning of the classification conforms may be modified. Further, the token bucket configuration adjustment in accordance with the present invention comprehends adjustments that modify bucket depth and class assignments.

Figure 11:
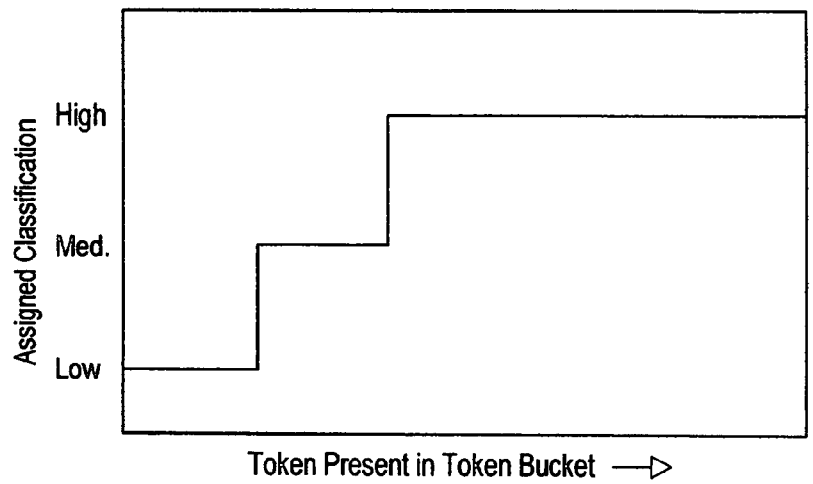
FIG. 11 illustrates a dynamic adjustment of the token bucket configuration and is best understood with a comparison to FIG. 5.

FIG. 11 illustrates a dynamic adjustment of the token bucket configuration of FIG. 5. As shown, going from the FIG. 5 configuration to the FIG. 11 configuration involves a change in the shape of the assignment classification function. FIGS. 5 and 11 do not specifically indicate amounts of tokens. In one form of the dynamic adjustment, going from the FIG. 5 configuration to the FIG. 11 configuration involves increasing the size of the token bucket depth without changing the levels where assigned class changes. Accordingly, more overall burst capability is provided in FIG. 11 and that additional part of the burst capability is at the highest class.

Figure 12:
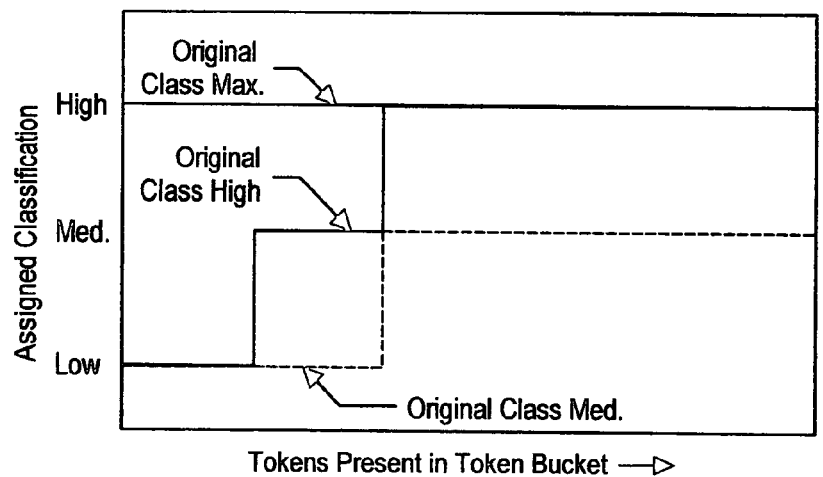
FIG. 12 illustrates a dynamic adjustment of the token bucket configuration and is best understood with a comparison to FIG. 6.

FIG. 12 illustrates a dynamic adjustment of the token bucket configuration of FIG. 6. As shown, going from the FIG. 6 configuration to the FIG. 12 configuration involves a change in the shape of the assignment classification function for each original class. FIGS. 6 and 12 do not specifically indicate amounts of tokens. In one form of the dynamic adjustment, going from the FIG. 6 configuration to the FIG. 12 configuration involves increasing the size of the token bucket depth without changing the levels where assigned class changes (this is true for each original class). Accordingly, more overall burst capability is provided in FIG. 12 (for each original class) and that additional part of the burst capability is at the highest class (for each original class).

FIG. 13 illustrates a dynamic adjustment of the token bucket configuration of FIG. 7. As shown, going from the FIG. 7 configuration to the FIG. 13 configuration involves a change in the assignment classification probability mass function. FIGS. 7 and 13 do not specifically indicate amounts of tokens. In one form of the dynamic adjustment, going from the FIG. 7 configuration to the FIG. 13 configuration involves increasing the size of the token bucket depth without changing the overall feel of the probability mass function for the previously existing domain. The added domain due to the increase in bucket depth has corresponding function values that provide additional overall burst capability particularly at the highest class.

In applications where packets arrive with an original class and are remarked with a probability mass function, and each original class has a corresponding probability mass function for assigning a class for remarking, each probability mass function may be adjusted.

FIG. 14 illustrates a traffic regulator 80 in an alternative embodiment of the present invention. Traffic regulator 80 includes bucket mechanism 82. Bucket mechanism 82 includes first and second token buckets 84 and 86, respectively, and optional other bucket arrangements 88 to provide more complex packet handling when required for a particular application. First token bucket 84 is configured to receive new tokens at a first fill rate and has a first bucket depth. Second token bucket 86 is configured to receive new tokens at a second fill rate and has a second bucket depth. First token bucket 84 uses tokens to regulate the packet flow in terms of packet rate. Second token bucket 86 uses tokens to regulate the packet flow in terms of data rate. A particular packet is subjected to handling in accordance with both the first token bucket and the second token bucket. That is, when a packet arrives at bucket mechanism 82 for handling, in order to be sent normally, the packet must confirm to the requirements of token bucket 84 and token bucket 86. Put another way, the subscriber is simultaneously subjected to sustain rate and burst size limits in terms of packets and subjected to sustain rate and burst size limits in terms of data (bits or bytes). As further illustrated in FIG. 14, token buckets 84 and 86 are subjected to dynamic adjustment based on network demand.

FIG. 15 illustrates a traffic regulator 90 in another alternative embodiment of the present invention. Traffic regulator 90 includes bucket mechanism 92. Bucket mechanism 92 includes token bucket 94 and optional other bucket arrangements 96 to provide more complex packet handling when required for a particular application. Token bucket 94 uses tokens to regulate the packet flow by removing tokens from token bucket 94 when handling packets. The amount of tokens to be removed is based on the amount of the flow and is further based on a classification of the flow. That is, the identical amount of flow may result in different amounts of tokens being removed for different classifications of traffic. Token bucket 94 is subjected to dynamic adjustment based on network demand.

With reference to FIG. 16, a preferred technique for determining the tokens to be removed from token bucket 94 to send a packet normally is illustrated. Token bucket 94 may regulate in terms of packets or in terms of data. Block 100 represents the determination of the base amount of tokens for the flow being processed. The classification of the flow in the preferred technique dictates a token multiplier. Block 102 represents determining the multiplier. That is, the amount of the flow (in terms of data or in terms of packets depending on the implementation) determines a base number of tokens that is multiplied by the multiplier determined from the flow classification to determine (at block 104) the total number of tokens to be removed.

There are many advantages associated with embodiments of the present invention. A subscriber's token bucket configuration is dynamically adjusted to modify aspects of the subscriber's network connection performance. These dynamic adjustments are made based on network demand measurements. In this way, it is possible to deliver higher performance for certain types of subscriber behavior. The adjustments to the configuration may increase or decrease the subscriber's ability to receive bursts of data. Changes to bucket depth change the burst size while changes to class assignment policy change the way the data is handled further downstream. The token bucket configuration could be adjusted in real-time to decrease a subscriber's burst capability when the subscriber engages in behavior that is generally sustain rate limited to prevent a continuous pattern of large bursts spaced apart by backoff periods. The token bucket could again be adjusted in real-time to increase the subscriber's burst capability when the subscriber ceases to engage in the sustain rate limited behavior. In this way, a subscriber is granted very generous burst capability when the subscriber is not pushing the sustain rate limit for long periods of time. Accordingly, a subscriber engaging in basic low bandwidth web browsing or email would experience large bursts and perceive high performance. On the other hand, a subscriber engaging in demanding high bandwidth activities would have much more restricted burst capability which would reduce network congestion.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A packet communication method, the method comprising:
   receiving packets associated with a user at a regulator in a network;
   implementing, by the regulator, a token bucket regulation for handling the packets associated with the user, the token bucket having a token bucket sustain rate and a token bucket depth;
   determining that a demand placed on the network by the user has met or exceeded the sustain rate; and
   in response to determining that the demand has met or exceeded the sustain rate, temporarily increasing the user's token bucket depth, and reducing the token bucket depth after the temporary increase has expired,
   the method further comprising measuring a demand placed on the network by the user for traffic in a different direction than the direction in which the packets associated with the user are received at the regulator.

2. The method of claim 1 further comprising increasing the token bucket sustain rate.

3. The method of claim 1 further comprising modifying packet remarking classifications based on a number of tokens available in the token bucket.

4. The method of claim 3 wherein the remarking classifications includes a drop classification.

5. The method of claim 3, further comprising remarking classifications of the packets, wherein incoming packets having a maximum priority classification are maintained at a highest remarking class, but incoming packets having other classifications are remarked.

6. The method of claim 1 further comprising assigning a classification to a particular packet based on the number of tokens in the token bucket.

7. The method of claim 6 wherein: the assigning of the classification takes place in accordance with a predetermined relationship between the number of tokens in the token bucket and classification.

8. The method of claim 6 wherein: the assigning of the classification takes place in accordance with a probability mass function that determines the probability mass for each classification based on the number of tokens in the token bucket.

9. The method of claim 1 wherein: the token bucket regulation further includes a second token bucket associated with the user.

10. The method of claim 1 further comprising assigning a classification to a particular packet according to a policy based on the number of tokens present; and the method further includes modifying the policy to which the assigning of the classification conforms.

11. The method of claim 10 wherein: the policy to which the assigning of the classification conforms is based on a predetermined relationship between number of tokens in the token bucket and appropriate classification.

12. The method of claim 10 wherein: the policy to which the assigning of the classification conforms is based on a probability mass function that determines the probability mass for each classification based on the number of tokens in the token bucket.

13. The method of claim 1, wherein the receiving is performed on a wired communication network.

14. The method of claim 1, wherein the packets carry telephony data.

15. A packet communication method, the method comprising:
  receiving packets associated with a user at a regulator in a network;
  implementing, by the regulator, a token bucket regulation for handling the packets associated with the user, the token bucket having a token bucket depth and a sustain rate;
  determining that a demand placed on the network by the user over a period of time has met or exceeded the sustain rate, and in response to so determining, temporarily reducing the user's bucket depth;
  determining that the user's data traffic pattern has remained under the sustain rate for a predetermined period of time, and in response to so determining, restoring the user's bucket depth; and
  measuring a demand placed on the network by the user for traffic in a different direction than the direction in which the packets associated with the user are received at the regulator.

16. The method of claim 15 further comprising determining a burst demand based on observations made while monitoring a number of tokens in the token bucket over a period of time.

17. The method of claim 15, further comprising assigning a classification to the particular packet according to a policy based on the number of tokens present; and the method further includes modifying the policy to which the assigning of the classification conforms.

\* \* \* \* \*